US008831575B2

(12) United States Patent
Duggal et al.

(10) Patent No.: US 8,831,575 B2
(45) Date of Patent: Sep. 9, 2014

(54) APPARATUS AND METHODS ASSOCIATED WITH OPEN MARKET HANDSETS

(75) Inventors: Nakul Duggal, San Diego, CA (US); Hai Qu, San Diego, CA (US); Bryan Gurganus, San Diego, CA (US); Alejandro R Holcman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 868 days.

(21) Appl. No.: 12/185,283

(22) Filed: Aug. 4, 2008

(65) Prior Publication Data

US 2009/0081996 A1 Mar. 26, 2009

Related U.S. Application Data

(60) Provisional application No. 60/975,405, filed on Sep. 26, 2007.

(51) Int. Cl.
*H04W 4/24* (2009.01)
*H04L 12/14* (2006.01)
*H04L 29/08* (2006.01)
*H04L 12/24* (2006.01)
*H04W 8/24* (2009.01)

(52) U.S. Cl.
CPC .......... *H04L 41/5096* (2013.01); *H04L 67/306* (2013.01); *H04L 41/0806* (2013.01); *H04L 41/0873* (2013.01); *H04L 12/1485* (2013.01); *H04L 41/5054* (2013.01); *H04W 8/24* (2013.01); *H04W 4/24* (2013.01); *H04L 67/14* (2013.01)
USPC ......... 455/414.1; 455/406; 455/466; 709/229

(58) Field of Classification Search
CPC ........ H04W 4/24; H04W 8/24; H04L 67/306; H04L 67/14; H04L 41/0873; H04L 41/5096

USPC .......... 455/414.1, 552.1, 557, 558, 406, 466; 709/229

See application file for complete search history.

(56) References Cited

U.S. PATENT DOCUMENTS 5,675,628 A 10/1997 Hokkanen
6,557,753 B1 5/2003 Beaujard et al.
(Continued)

FOREIGN PATENT DOCUMENTS

CN 1864429 A 11/2006
CN 1969527 A 5/2007
(Continued)

OTHER PUBLICATIONS

Taiwan Search Report—TW097137362—TIPO—Apr. 6, 2012.

(Continued)

*Primary Examiner* — Mahendra Patel
(74) *Attorney, Agent, or Firm* — Abdollah Katbab

(57) ABSTRACT

Apparatus and methods of differentiated data session access on a wireless communication device and dynamic source determination of provisioning information on a wireless communication device are disclosed. User Identity Modules (UIMs) are provisioned such that network-service applications resident on the wireless device are associated with a corresponding application profile within the UIM. Each network-service application has a corresponding network address identifier defined within the user profile. The network address associated with the identifier is used to establish a data session for the corresponding network service application. By providing for application-specific network addresses, service providers and/or network operators can differentiate between what services a user is accessing during a data session. In addition, the UIMs may be provisioned with priority category identifiers that allow the associated network-service application to be prioritized for data session establishment.

45 Claims, 9 Drawing Sheets

(56) References Cited

U.S. PATENT DOCUMENTS

| | | |
|---|---|---|
| 6,584,326 B1 | 6/2003 | Boydston et al. |
| 6,725,056 B1 | 4/2004 | Moles et al. |
| 6,801,528 B2 | 10/2004 | Nassar |
| 6,829,593 B1 | 12/2004 | Ritter et al. |
| 6,845,153 B2 | 1/2005 | Tiburtius et al. |
| 6,916,546 B2 | 7/2005 | Schoennenbeck et al. |
| 6,944,150 B1 | 9/2005 | McConnell et al. |
| 7,149,293 B1 | 12/2006 | Coppage et al. |
| 7,149,545 B2 | 12/2006 | Hurst et al. |
| 7,292,855 B2 | 11/2007 | Kumar et al. |
| 7,353,017 B2 | 4/2008 | Chen et al. |
| 7,366,780 B2 * | 4/2008 | Keller et al. .................. 709/227 |
| 7,389,119 B2 | 6/2008 | Weigele |
| 7,489,947 B2 * | 2/2009 | Castrogiovanni et al. .... 455/558 |
| 7,613,479 B2 | 11/2009 | Twigg et al. |
| 7,792,759 B2 * | 9/2010 | Sahota et al. .................. 705/67 |
| 7,826,842 B2 | 11/2010 | Buckley et al. |
| 8,199,014 B1 * | 6/2012 | Kindeberg ................. 340/572.1 |
| 2001/0047363 A1 * | 11/2001 | Peng ......................... 707/104.1 |
| 2002/0116480 A1 * | 8/2002 | Muto ............................ 709/220 |
| 2002/0188736 A1 | 12/2002 | Jarvensivu |
| 2003/0125023 A1 | 7/2003 | Fishler |
| 2003/0186722 A1 | 10/2003 | Weiner |
| 2003/0211840 A1 | 11/2003 | Castrogiovanni et al. |
| 2003/0211861 A1 | 11/2003 | Castrogiovanni et al. |
| 2003/0220101 A1 | 11/2003 | Castrogiovanni et al. |
| 2004/0004968 A1 | 1/2004 | Nassar |
| 2004/0043788 A1 | 3/2004 | Mittal |
| 2004/0075675 A1 | 4/2004 | Raivisto et al. |
| 2004/0166839 A1 | 8/2004 | Okkonen et al. |
| 2004/0192306 A1 | 9/2004 | Elkarat et al. |
| 2004/0192386 A1 | 9/2004 | Aerrabotu et al. |
| 2004/0203737 A1 | 10/2004 | Myhre et al. |
| 2004/0204051 A1 | 10/2004 | Scott et al. |
| 2004/0204087 A1 | 10/2004 | Carlsson |
| 2004/0204089 A1 | 10/2004 | Castrogiovanni et al. |
| 2004/0228356 A1 | 11/2004 | Adamczyk et al. |
| 2004/0230677 A1 | 11/2004 | OHara |
| 2005/0020308 A1 | 1/2005 | Lai |
| 2005/0064862 A1 | 3/2005 | Castrogiovanni et al. |
| 2005/0071423 A1 | 3/2005 | Rajaniemi |
| 2005/0071459 A1 | 3/2005 | Costa-Requena et al. |
| 2005/0085244 A1 | 4/2005 | Choi et al. |
| 2005/0147127 A1 | 7/2005 | Putcha et al. |
| 2005/0153741 A1 | 7/2005 | Chen et al. |
| 2005/0174937 A1 | 8/2005 | Scoggins et al. |
| 2005/0184163 A1 | 8/2005 | de Jong |
| 2005/0184164 A1 | 8/2005 | de Jong |
| 2005/0184165 A1 | 8/2005 | de Jong |
| 2005/0188360 A1 | 8/2005 | de Jong |
| 2005/0239504 A1 | 10/2005 | Ishii et al. |
| 2006/0059125 A1 | 3/2006 | Yan |
| 2006/0099600 A1 | 5/2006 | McIntire |
| 2006/0126590 A1 | 6/2006 | Putcha et al. |
| 2006/0141987 A1 | 6/2006 | De Groot |
| 2006/0143098 A1 | 6/2006 | Lazaridis |
| 2006/0172734 A1 | 8/2006 | Tak |
| 2006/0195593 A1 * | 8/2006 | Shiraki et al. .................. 709/227 |
| 2006/0217113 A1 | 9/2006 | Rao et al. |
| 2006/0234760 A1 | 10/2006 | Cheng |
| 2006/0258341 A1 | 11/2006 | Miller et al. |
| 2006/0262736 A1 | 11/2006 | Dong et al. |
| 2006/0270453 A1 | 11/2006 | Di Giorgio et al. |
| 2007/0064270 A1 | 3/2007 | Ikegami |
| 2007/0115950 A1 | 5/2007 | Karaoguz et al. |
| 2007/0177562 A1 | 8/2007 | Castrogiovanni et al. |
| 2007/0186107 A1 | 8/2007 | Sonetaka |
| 2007/0191040 A1 * | 8/2007 | Kadar et al. .................. 455/466 |
| 2007/0202749 A1 | 8/2007 | Bhat et al. |
| 2007/0218871 A1 | 9/2007 | Bonner |
| 2007/0224969 A1 | 9/2007 | Rao |
| 2007/0232354 A1 | 10/2007 | Moscovitz et al. |
| 2007/0245008 A1 * | 10/2007 | Matsui et al. ................. 709/223 |
| 2007/0293192 A9 | 12/2007 | De Groot |
| 2008/0014956 A1 | 1/2008 | Balasubramanian |
| 2008/0014984 A1 | 1/2008 | Brown et al. |
| 2008/0028038 A1 | 1/2008 | Kaplan |
| 2008/0034425 A1 | 2/2008 | Overcash et al. |
| 2008/0049662 A1 | 2/2008 | Islam et al. |
| 2008/0057957 A1 | 3/2008 | Altbaum et al. |
| 2008/0108333 A1 | 5/2008 | Jemison et al. |
| 2008/0146280 A1 | 6/2008 | Sasse et al. |
| 2008/0161050 A1 | 7/2008 | Shudark et al. |
| 2008/0194276 A1 * | 8/2008 | Lin et al. ....................... 455/466 |
| 2009/0061833 A1 | 3/2009 | Ho et al. |
| 2009/0082004 A1 | 3/2009 | Duggal et al. |
| 2009/0082029 A1 | 3/2009 | Holcman et al. |
| 2010/0035595 A1 | 2/2010 | Duggal et al. |

FOREIGN PATENT DOCUMENTS

| | | |
|---|---|---|
| EP | 1265397 A2 | 12/2002 |
| EP | 1411712 | 4/2004 |
| EP | 1519600 A2 | 3/2005 |
| EP | 1050175 B1 | 4/2005 |
| EP | 1564960 A1 | 8/2005 |
| JP | 3056082 B2 | 6/2000 |
| JP | 2001134688 A | 5/2001 |
| JP | 2001224062 A | 8/2001 |
| JP | 2002521938 A | 7/2002 |
| JP | 2004153461 A | 5/2004 |
| JP | 2004297192 A | 10/2004 |
| JP | 2005537715 A | 12/2005 |
| JP | 2006174158 A | 6/2006 |
| JP | 2007506370 A | 3/2007 |
| JP | 2007180675 A | 7/2007 |
| RU | 2169437 | 6/2001 |
| RU | 2000115584 A | 6/2002 |
| RU | 2196393 C2 | 1/2003 |
| RU | 2005115091 A | 11/2005 |
| WO | 0005913 A1 | 2/2000 |
| WO | 2004021590 | 3/2004 |
| WO | WO2004036941 | 4/2004 |
| WO | WO2005029748 A2 | 3/2005 |
| WO | 2005036916 A1 | 4/2005 |
| WO | WO2005053348 | 6/2005 |
| WO | WO2005103919 A1 | 11/2005 |
| WO | WO2006109155 A2 | 10/2006 |
| WO | WO2007081727 | 7/2007 |

OTHER PUBLICATIONS

International Search Report and Written Opinion—PCT/US2008/077811, International Search Authority—European Patent Office—Mar. 5, 2009.

* cited by examiner

APPARATUS AND METHODS ASSOCIATED WITH OPEN MARKET HANDSETS

CLAIM OF PRIORITY UNDER 35 U.S.C. §119

The present Application for Patent claims priority to Provisional Application No. 60/975,405, entitled, "Apparatus and Methods Associated with Open Market Handsets," filed on 26 Sep. 2007 and assigned to the assignee hereof and hereby expressly incorporated by reference herein.

CROSS-REFERENCE TO RELATED APPLICATIONS

The present application is related to U.S. patent application Ser. No. 12/185,321, entitled "Apparatus and Methods for Network Identification of Open Market Wireless Devices"; U.S. patent application Ser. No. 12/185,298, entitled "Methods and Apparatus for Dynamic Source Determination of Provisioning Information on a Per-Network Service Basis for Open Market Wireless Devices"; U.S. patent application Ser. No. 12/185,344, entitled "Methods and Apparatus for Application Network-Server Determination for Removable Module-Based Wireless Devices". These applications have been filed concurrently herewith the present application and are assigned to the same assignee as the present invention. These applications are hereby incorporated by reference as if set forth fully herein.

BACKGROUND

1. Field

The present aspects relate to wireless communication devices, and more particularly, to systems, apparatus and methods for storing provisioning information on a wireless device, specifically provisioning information that supports multiple application profiles and resolution of data session conflict for network service applications requesting simultaneous network access.

2. Background

A wireless communication device, otherwise referred to as a handset, is utilized to communicate with another handset or a landline phone via a wireless communication network. In order to establish a connection with the wireless communication network, the handset must have a relationship with an operator or service provider to allow access to the wireless communication network and to manage billing the user of the handset for the use of the wireless communication network. In a closed market system, the operator maintains a degree of control over the distribution and sale of handsets operable on the wireless communication network of the operator. For example, the operator may distribute and sell the handsets itself, or authorize a third party to perform this task, where the respective closed market handsets are authorized and provisioned by the operator to work on the wireless communication network of the operator. Thus, a closed market handset is limited for use in a specific wireless communication network corresponding to the respective operator.

In contrast to the closed market system, an open market system allows a handset to be distributed and sold for use on any of a plurality of wireless communication networks each corresponding to a respective one of a plurality of different operators. In the open market system, a user must obtain a removable module, such as a smart card, from one of the plurality of different operators, where the user identity module includes a key or other authorization mechanism allowing operation on one of the plurality of wireless communication networks. The user may then insert a removable module that includes user identity information into the open market handset, thereby enabling the open market handset to communicate with the respective wireless communication network associated with the operator that authorized the removable module. For example, a removable module may be referred to as a Removable User Identity Module (RUIM) for a Code Division Multiple Access (CDMA) system, a CDMA Subscriber Identity Module (CSIM) based on a Universal Integrated Circuit Card (UICC) for a CDMA system, Universal Subscriber Identity Module (USIM) based on a UICC for Universal Mobile Telecommunications System (UMTS), or a Subscriber Identity Module (SIM) in a Global System for Mobile communications (GSM) system. For the sake of brevity the term removable module is used herein throughout to refer to any module that may be inserted or otherwise is communication with a wireless device that provides for storage of data, such as user identity information.

In either the closed market or open market scenario the provisioning information within the handset is generally limited to establishing and maintaining a single data session at one particular time. In this regard, all network-related applications are generally configured to allow for the use the same data session. For example, if the user is executing an Internet browsing application and subsequently desires to send a message using a Multimedia Messaging Service (MMS) application, the same point-to-point protocol (PPP) data session may be used for both browsing the Internet and sending the MMS message. While this is generally convenient to the wireless device user, it does not allow the network operators and/or service provides an adequate means to track application/service usage. The ability to track application/service usage may be necessary if the network operators and/or service providers desire to bill the user according to the services or applications as opposed to the generic data session. For example, the network operator may desire to bill the user at a first rate for Internet browsing and bill the user at a second rate for MMS messaging. In addition to billing, tracking of application-specific usage may be beneficial to other known or future-known purposes.

Therefore a need exists to develop systems, apparatus and methods that provide the network operators and or service providers the ability to track and, in some instances, bill for application usage on a per data session basis and/or on a time of usage basis.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Present aspects define systems, apparatus and methods for provisioning wireless devices with multiple application profiles, such that application-specific network address identifiers are assigned to each application profile. In this regard, data sessions for the applications are established using the application-specific network address. This feature allows the service providers and or network operators to track data sessions based on the application/service that is being used during the data session. The tracking of data session according to application/service usage can provide for differentiated billing schemes based on application/service usage or other tracking-related applications can benefit from such information.

In addition, present aspects may provide for categorizing the application profiles according to data session priority. Categorizing the application profiles according to data session priority assists in determining which data session should be maintained or established in the instance in which a user has established a first data session associated with a first application and subsequently desires to launch a second application while the first data session is ongoing. Thus, in some aspects, the data session related to the application provided higher priority, as defined by the categorization the application profile, will be maintained or established, while the data session provided a lower priority, will either be closed down or not established. In the instance in which the two applications share the same category and thus have the same priority, the subsequently launched second application may share the existing data session.

In one aspect, a method of differentiated data session access on a wireless communication device is defined. The method includes receiving an input to launch a first network-service application and retrieving, from a user identity module in communication with the wireless communication device, a first application profile selected from a plurality of application profiles each having respective profile data. As such, the first application profile corresponds to the first network-service application and includes first profile data. The method additionally includes establishing a first data session for the first network-service application according to the first profile data and launching the first network-service application using the first data session.

In one aspect of the method, retrieving the first application profile further includes retrieving the first application profile that corresponds to the first network service application and comprises first profile data including a first network address identifier. In this regard, in certain aspects, establishing a first data session for the first application further includes establishing a first data session for the first application based on the first network address identifier.

In one optional aspect, the method may further include receiving an input to launch a second network-service application while the first data session is ongoing, and retrieving, from the user identity module, a second application profile selected from the plurality of application profiles. As such, the second application profile corresponds to the second network-service application and includes second profile data. Additionally, the method may include comparing a first priority category from the first profile data and a second priority category from the second profile data and, if the comparison results in the first priority category matching the second priority category, then launching the second application using the first data session.

In another optional aspect, the method may further include receiving an input to launch a second network-service application while the first data session is ongoing, and retrieving, from the user identity module, a second application profile selected from the plurality of application profiles. As such, the second application profile corresponds to the second network-service application and comprises second profile data. Additionally, the method may include comparing a first priority category from the first profile data and a second priority category from the second profile data and, if the comparison results in the first application category not matching the second application category, identifying a conflict and determining a resolution to the conflict based on a predetermined resolution routine.

In one further aspect of the method, determining a resolution to the conflict may include identifying which one of the first priority category and the second application category corresponds to a preferred priority category and maintaining the first data session and not launching the second application, if the first priority category is identified as the preferred priority category or closing the first data session, establishing a second data session according to the second profile data and launching the second network-service application using the second data session, if the second priority category is identified as the preferred priority category.

Alternatively, in other aspects, determining a resolution to the conflict may include providing a conflict notification to a user of the wireless device. The conflict notification provides a first user option to maintain the first data session and not launch the second network-service application and a second user option to close the first data session, establish the second data session and launch the second network-service application. Additionally the method may include, in response to providing the conflict notification, receiving a user input that corresponds to the first user option and maintaining the first data session and not launching the second application. Alternatively, the method may include, in response to providing the conflict notification, receiving a user input that corresponds to the second user option and closing the first data session, establishing a second data session according to the second profile data and launching the second network-service application using the second data session.

In those aspects in which a second data session is established, the second application profile that corresponds to the second application may include a network address identifier that differs from the first network address identifier. In such aspects, the second data session is established based in the second network address identifier.

In another alternate aspect of the method establishing either the first or second data session may further include generating first billing data corresponding to the first profile data, or generating second billing data corresponding to the second profile data. In such aspects, the first and second billing data may be based on the application-specific network address identifiers and, as such the first billing data differs from the second billing data in respect to the network address identifiers.

A related aspect is provided for by at least one processor that is configured to provide differentiated data session access on a wireless communication device. The processor includes a first module for receiving an input to launch a first network-service application and a second module for retrieving, from a user identity module in communication with the wireless communication device, a first application profile selected from a plurality of application profiles each having respective profile data. As such, the first application profile corresponds to the first network-service application and comprises first profile data. The processor additionally includes a third module for establishing a first data session for the first network-service application according to the first profile data and a fourth module for launching the first network-service application using the first data session.

A further related aspect is defined by a computer program product that includes a computer-readable medium. The medium includes a first set of codes for causing a computer to receive an input to launch a first network-service application and a second set of codes for causing the computer to retrieve, from a user identity module in communication with the wireless communication device, a first application profile selected from a plurality of application profiles each having respective profile data. As such, the first application profile corresponds to the first network-service application and includes first profile data. The medium further includes a third set of codes for causing the computer to establish a first data session for the first network-service application according to the first profile data and a fourth set of codes for causing the computer to launch the first network-service application using the first data session.

In yet another related aspect an apparatus for providing differentiated data session access on a wireless communication device is provided. The apparatus includes means for receiving an input to launch a first network-service application and means for retrieving, from a user identity module in communication with the wireless communication device, a first application profile selected from a plurality of application profiles each having respective profile data. The first application profile corresponds to the first network-service application and comprises first profile data. The apparatus additionally includes means for establishing a first data session for the first network-service application according to the first profile data and means for launching the first network-service application using the first data session.

A further aspect of the innovation provides for a wireless communication device that includes a computer platform having a processor and a memory. The wireless device additionally includes a plurality of network-service applications in communication with the processor and stored in the memory. Additionally, the wireless device includes a user identity module in communication with the processor that includes a plurality of application profiles. Each application profile corresponds to one of the plurality of network service applications and includes profile data. The wireless device also includes a communications interface in communication with the processor and operable to establish a data session with a wireless communications network for one of the plurality of a network service applications based on the profile data and an input to launch the network service application.

In one optional aspect of the wireless device the user identity module further includes the plurality of application profiles including profile data that includes an application-specific network address identifier. In such aspects, the application specific network address identifier may be used to establish the data session with the wireless communications network for the corresponding network service application.

In another optional aspect of the wireless device the user identity module further includes the plurality of application profiles including profile data that includes a priority category identifier that corresponds to a data session priority for the corresponding network-service application. In such aspects, the wireless device may further include a data session manager in communication with the processor and communications interface. The data session manager is operable to resolve a data session conflict if a second network-service application is attempted to be launched while a pre-existing first network-service application has an established first data session.

In one aspect of the wireless device that includes the data session manager, the data session manager may operable to resolve the conflict based on a comparison of the priority category identifier in the corresponding application profiles. In such aspects the data session manager may be further operable to communicate a command to the communications interface to close the first data session and establish a second data session if the second network-service application has a more preferred priority than the first network-service application. Alternatively, in other aspects the data session manager may be further operable to communicate a command to the communications interface to maintain the first data session and prohibit the second network-service application from launching, if the first network-service application has a more preferred priority than the second network-service application.

In alternate aspects of the wireless device that includes the data session manager, the data session manager may further include a conflict notification generator operable to generate a conflict notification and communicate the notification to a user of the device. The conflict notification provides the user with a first option to continue the first data session or a second option to close the first data session and establish a second data session. In this regard the first option allows for the user to maintain the first network-service application, while the second option allows the user to close the first network-service application and begin use of the second network-service application.

In yet a further aspect, the wireless device may optionally include a billing data generator in communication with the processor and the data session manager. The billing data generator is operable to generate billing data on a per data session basis and communicate the billing data to a network entity.

An additional aspect of the present innovation is provided for wireless device provisioning at a network device. The method includes providing for a plurality of application profiles that correspond to a network-service application and include an application-specific network address identifier operable for establishing a data session for the corresponding network-service application and providing a wireless communication device with a user identity module that includes one or more of the application profiles. In optional aspects the method may further include receiving data session tracking information based on wireless device usage of a network address associated with the network address identifier. In those aspects of the method that include receiving data session tracking information, the method may further include determining billing information for data session usage based on the received data session tracking information.

In an additional optional aspect the method may further include categorizing the one or more application profiles according to application priority and providing for a priority category identifier in each of the plurality of application profiles. In such aspects the method may further include providing for a conflict resolution routine that is operable to resolve a data session conflict for network-service applications based on the priority category identifiers in the application profiles and providing for the conflict resolution routine in the user identity module. In one aspect of the method providing the conflict resolution routine further includes providing a conflict resolution routine that automatically maintains or establishes a data session associated with the network-service application determined to have a priority category identifier associated with a more preferred application priority. In another aspect of the method providing the conflict resolution routine further includes providing a conflict resolution routine that communicates a conflict notification to a user of the wireless communication device based on identification of a data session conflict. The data session conflict notification may provide for a first user option to maintain an existing data session and a second user option to close the existing data session and establish a subsequent data session.

A related aspect is defined by at least one processor configured to provision a wireless device at a network device The processor includes a first module for providing for a plurality of application profiles that correspond to a network-service application and include an application-specific network address identifier operable for establishing a data session for the corresponding network-service application. The processor additionally includes a second module for providing a wireless communication device with a user identity module that includes one or more of the application profiles.

A further related aspect is provided for by a computer program product that includes a computer-readable medium. The medium includes a first set of codes for causing a computer to provide for a plurality of application profiles that correspond to a network-service application and include an application-specific network address identifier operable for establishing a data session for the corresponding network-service application and a second set of codes for causing the computer to provide a wireless communication device with a user identity module that includes one or more of the application profiles.

Yet a further related aspect is defined by an apparatus for providing differentiated data session access on a wireless communication device. The apparatus includes means for providing for a plurality of application profiles that correspond to a network-service application and include an application-specific network address identifier operable for establishing a data session for the corresponding network-service application and means for providing a wireless communication device with a user identity module that includes one or more of the application profiles.

Another aspect of the present innovation is provided for by a network system including one or more devices. The system includes a computer platform having a processor and a memory and a provisioning module in communication with the processor and stored in the memory. The provisioning module is operable to provide user identity modules (UIMs) with one or more application profiles that each correspond to a network-service application and include an application-specific network address identifier operable for establishing a data session for the corresponding network-service application.

In one aspect, the network system includes a data session tracking module operable to receive data session tracking information from wireless communication devices having the UIMs. The data session tracking information is based on wireless device usage of a network address associated with the network address identifier. In such aspects, the system may further include a billing module operable to determine billing charges for the data session usage in the wireless devices having UIMs based on the received data session tracking information.

In optional aspects of the network system the provisioning module is further operable to categorize the one or more application profiles according to data session priority and provide for a priority category identifier in each of the application profiles. In such aspects, the provisioning module may be further operable to provide a conflict resolution routine that is operable to resolve an application conflict for network-service applications based on the priority category identifiers in the application profiles and provide for the conflict resolution routine in the user identity module. In such aspects, the conflict resolution routine may be operable to automatically maintain or establish a data session associated with the network-service application determined to have a priority category identifier associated with a more preferred application priority. In other aspects, the conflict resolution routine may be operable to generate and communicate a data session conflict notification to a user of the wireless communication device based on identification of a data session conflict. The data session conflict notification provides for a first user option to maintain an existing data session and a second user option to close the existing data session and establish a subsequent data session.

Thus, present aspects provide for methods, systems and apparatus for providing differentiated data session access in a wireless device. User Identity Modules (UIMs) are provisioned such that network-service applications resident on the wireless device are associated with a corresponding application profile within the UIM. Each network-service application has a corresponding network address identifier defined within the user profile. The network address associated with the identifier is user to establish a data session for the corresponding network service application. By providing for application-specific network addresses, service providers and/or network operators can differentiate between what services a user is accessing during a data session. This provides for a tracking mechanism that may be used by the service provider or network operator to differentiate the billing rates associated with services. In addition, the UIMs may be provisioned with priority category identifiers that allow the associated network-service application to be prioritized for data session establishment.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

The present devices, apparatus, methods, computer-readable media and process ors now will be described more fully hereinafter with reference to the accompanying drawings, in which aspects of the invention are shown. The devices, apparatus, methods, computer-readable media and processors may, however, be embodied in many different forms and should not be construed as limited to the aspects set forth herein; rather, these aspects are provided so that this disclosure will be thorough and complete, and will fully convey the scope of the invention to those skilled in the art. Like numeric designators in the figures and the detailed description refer to like elements throughout.

The various aspects are described herein are in connection with a wireless communication device. A wireless communication device can also be called a subscriber station, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Disclosed apparatus, systems and methods of present aspects define a scheme in the R-UIM, SIM/USIM, UICC and other permanent or removable memory modules to store provisioning information to support the feature of individual data application profiles for multiple applications. Also, in some aspects, the disclosed apparatus and methods define a scheme to allow compatible applications to share the same data connection even if they have different application profiles, and to resolve conflicts if two application data profiles are not compatible.

Wireless devices are generally limited to establishing a single data session and, as such, multiple applications are allowed to share the data session. However, this type of multi-application data session does not provide network operators or service providers the ability to differentiate in terms of application usage. Such differentiation is necessary to track usage and, in certain instances, provide differentiated billing for network services based on usage. Present aspects address this concern by providing for individual application profiles in the UIM that include application-specific profile data used to establish a data session for a particular network-service application. In this regard, the network operator and/or service provider is able to differentiate between which network-service application is using a data session and, thus provide for application-specific tracking information that may be used for differentiated service billing and the like.

Figure 1:
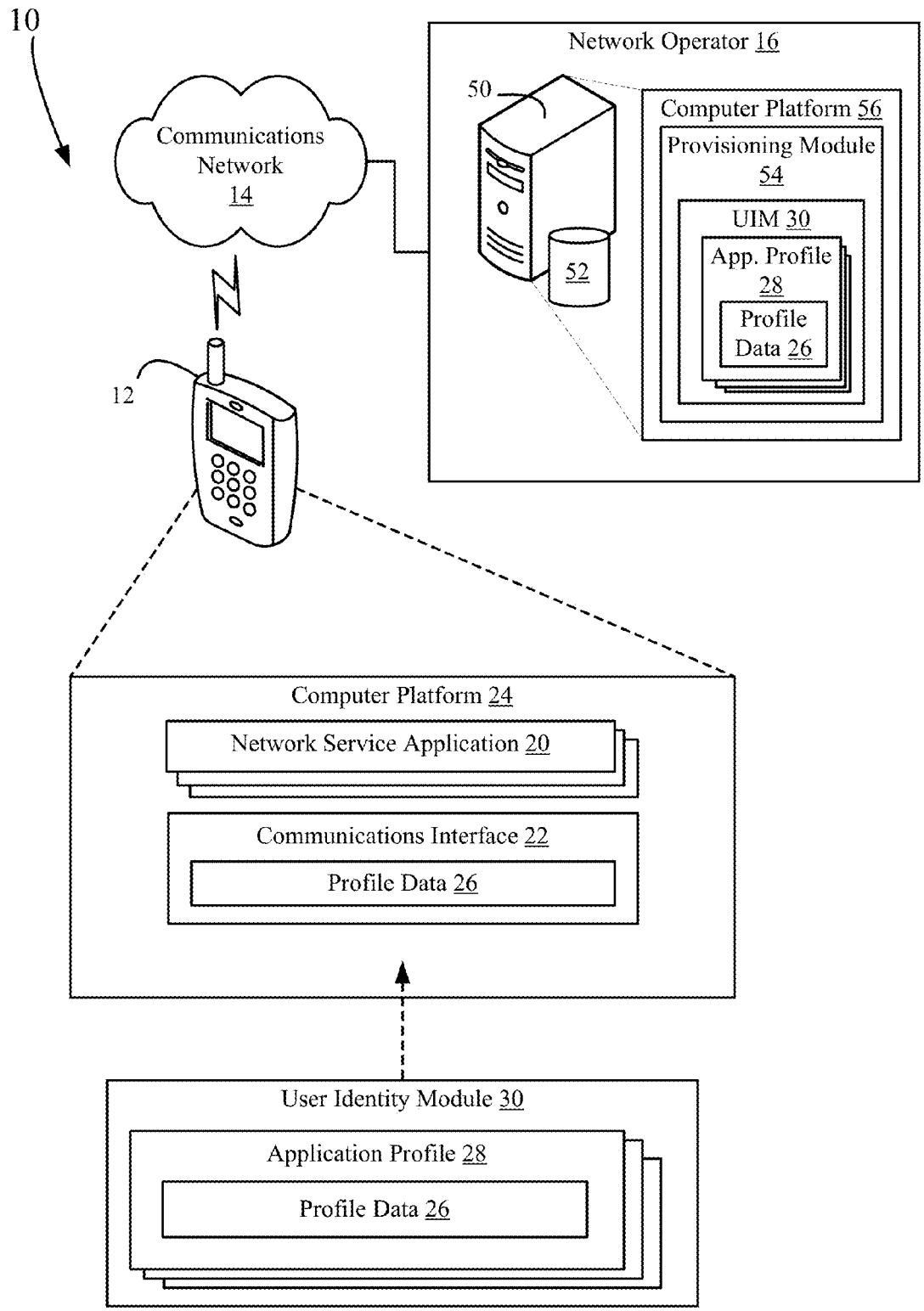
FIG. 1 is a schematic diagram of one aspect of a system for establishing differentiated data sessions between applications on a wireless device and a wireless network.

Referring to FIG. 1, in one aspect, a system 10 for establishing differentiated data sessions between applications on a wireless device and a wireless network includes a wireless device 12 operating on a communications network 14 under control of a network operator 16. Wireless device 12 includes one or more network-service applications 20 and a communications interface 22 stored on a computer platform 24. The network-service applications 20 may be any application that uses a data session for implementation. For example, the network service application 20 may be an Internet browser application, a Multimedia Message Service (MMS) application, a programming language application, such as Java, available from Sun Microsystems of Santa Clara, Calif. or the like, an open source application development platform, such Binary Run-time Environment for Wireless (BREW®) available form Qualcomm Corporation of San Diego, Calif. or the like, a Location-Based Service (LBS) application, such as a Global Positioning System (GPS) application or the like.

The communications interface 22 establishes a data session with the wireless communications network 14 for one of the plurality of network service applications 20 based an input to launch a particular network service application 20 and specific profile data 26 provided from the corresponding application profile 28 in the User Identity Module (UIM) 30.

The system 10 additionally includes a User Identity Module 30 that includes provisioning information necessary to allow the device to communicate on communication network 14. In certain aspects, such as when the wireless device 12 is an open market device, the UIM 30 is a removable UIM, such as a Removable User Identity Card (RUIC), which can be inserted and removed to and from the wireless device 12 to connect to computer platform 24 as dictated by the user of the device. In alternate aspects, such as when the wireless device 12 is a closed market device, the UIM 30 is a non-removable or permanent UIM, such as a SIM, UICC or the like, which is inserted in the device by the network operator 16, device manufacturer or the like. The UIM 30 serves to identify a user/subscriber and enables the user/subscriber to interface with services of network operator 16.

The UIM 24 includes a plurality of application profiles 28 that each correspond to one of the plurality of network service applications 20 and that each include profile data 26. As previously noted, the profile data 26 is used by the communications interface 22 to establish a data session for the corresponding network-service application 20.

The system 10 additionally, includes a network operator 16 including one or more network devices 50, such as network servers and associated data storage devices 52 that store provisioning information and, optionally, data session tracking information. In one aspect, the network device 50 includes a computer platform 56 having a provisioning module 54 operable for defining provisioning information for wireless devices and providing the provisioning information to the wireless devices in the form of a User Identity Module (UIM) 30. Thus, in one aspect, the provisioning module 54 is operable to define and provide a plurality of application profiles 28, in which each application profile corresponds to a specific network-service application 20 that may be implemented on a wireless communication device 12. The provisioning module 54 additionally is operable to define and provide each application profile 28 with profile data 26. The profile data provides for an application-specific data session to be established, by the communications interface 22 of the wireless device 12, for the corresponding network service application 20.

Additionally, the provisioning module 50 of wireless device 30 is operable to define and provide for User Identity Modules (UIMs) 30 may take the form of removable cards, such as Removable-User Identity Cards (R-UICs) operable to be inserted into open market wireless devices based on subscriber/user procurement of a card. In other aspects, the UIMs may take the form of a permanent module, such as SIM or the like, that is inserted into the wireless device by the network operator prior to point-of-sale, point-of-lease or the like.

Thus, system 10 advantageously allows for establishing differentiated data sessions between applications on a wireless device and a wireless network.

Figure 2:
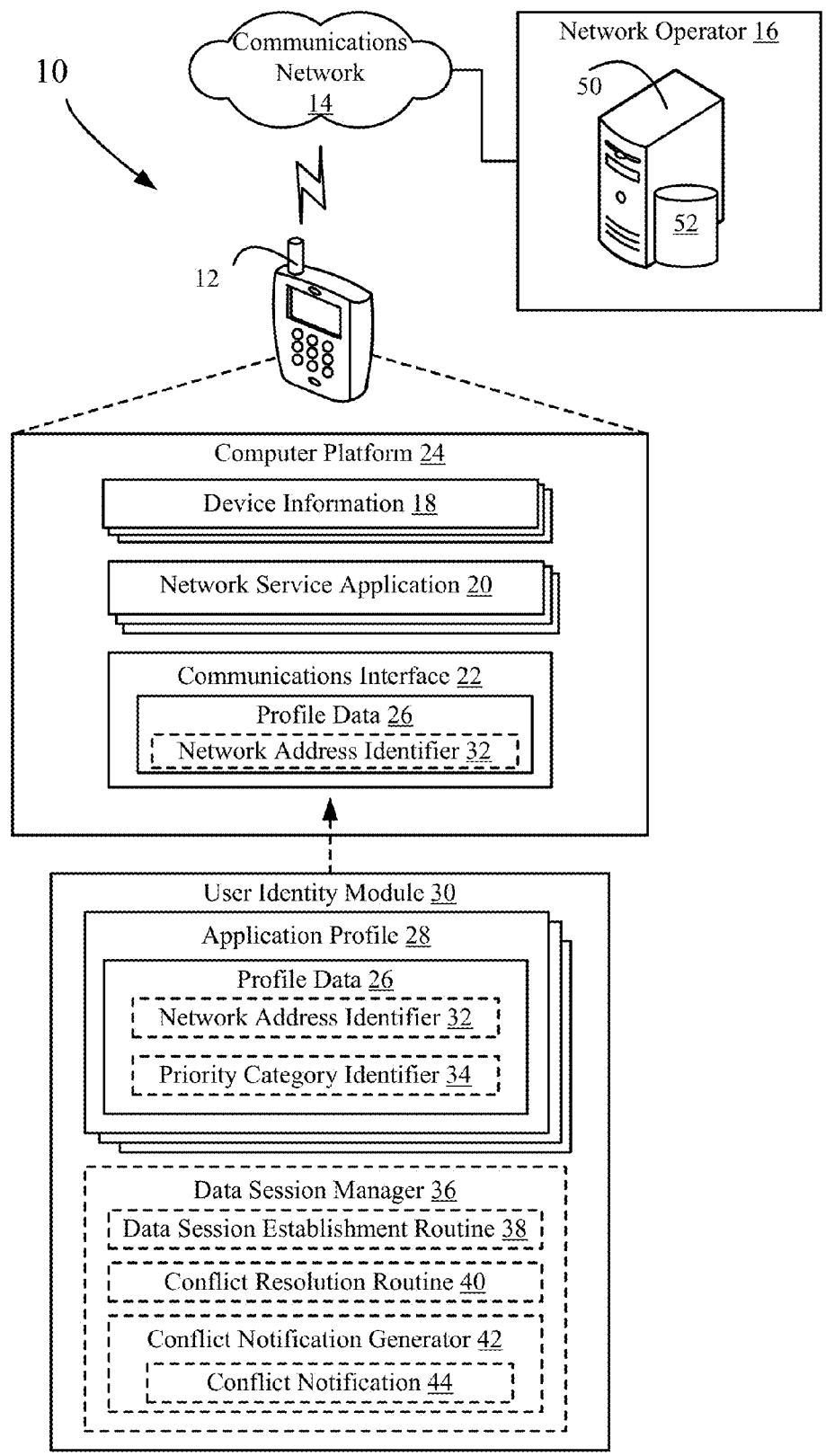
FIG. 2 is a schematic diagram of another aspect of a wireless device within a system for establishing differentiated data sessions between applications on a wireless device and a wireless network.

FIG. 2 provides for another more detailed aspect of system 10, in which the system for establishing differentiated data sessions further provides for conflict resolution for network-service applications requesting data session access at the same point in time. As previously described, system 10 includes a wireless device 12 operating on a communications network 14 under control of a network operator 16. In addition to one or more network-service applications 20 and a communications interface 22, the computer platform 24 of wireless device 12 may store device information 18. Device information 18 includes data about the respective wireless communications device, such as, but not limited to, make, model, device identifier such as an electronic serial number (ESN) or a mobile equipment identifier (MEID), a display capability, a software configuration, a firmware configuration, a hardware configuration, an audio capability, and any other wireless device-based information of interest to the operator. Thus, in one aspect, device information 18 may be used to establish and further identify an application-specific data session and certain device information may subsequently be relied upon by the network operator 16 in tracking data session usage or the like.

As previously noted, the communications interface 22 establishes a data session with the wireless communications network 14 for one of the plurality of a network service applications 20 based an input to launch a particular network service application 20 and specific profile data 26 provided from the corresponding application profile 28 in the User Identity Module (UIM) 30. In certain aspects, the communications interface may establish a data session with the communication network 14 for a network-service application 20 based on an application-specific network address identifier (NAI) 32 stored as profile data 26 in the corresponding application profile 28. In such aspects, the network-service applications 20 may be configured such that the applications have access to the network address identifier (NAI) 32 used to establish a data session for the network-service applications 20. In such aspects, the network-service applications 20 provide the NAI 32 to the data service layer and the communications interface 22 establishes the data session. Alternatively, the data services layer may be configured to access the requisite NAI 32, in the corresponding application profile 28 in the UIM 30.

As noted, system 10 includes UIM 24 that includes provisioning information necessary to allow the device to communicate on communication network 14. The UIM 24 includes a plurality of application profiles 28 that each corresponds to one of the plurality of network service applications 20 and include profile data 26. In certain aspects, the profile data 26 may include a network address identifier (NAI) 32 that may be used by the communications interface 22 to establish a data session for the corresponding network service application 20.

Additionally, according to some aspects, the profile data 26 of application profiles 28 may include a priority category identifier 34 that identifies the data session priority for the corresponding application 20. Priority category identifiers 34 may be used in conjunction with data session manager 36, which may be included in UIM 30 or alternatively, in other aspects, the data session manager may be stored on the wireless device 12. The data session manager 36 may include a data session establishment routine 38 that is operable to establish data sessions based on the profile data 26 of the application profile 28 corresponding to the network-service application that is currently being launched. The data session manager 36 may additionally include one or more conflict resolution routines 40 that are operable to resolve a conflict in the instances in which a data session is ongoing for a specific network-service application and the user/subscriber desires to launch another network-service application.

In one aspect, the conflict resolution routine 40 may be configured to compare the priority category identifier 34 of the network-service application 20 corresponding to the existing data session to the priority category identifier 34 of the network-service application 20 that the user-subscriber is attempting to launch. The network-service application 20 that has been assigned by the network operator 16 to have the more preferred priority (e.g. the higher priority) may be given access to the data session. Thus, if the more preferred priority network-service application is associated with the ongoing data session, the ongoing data session may be maintained. However, if the more preferred priority network-service application is associated with the subsequently requested application, the current data session may be shut down and a new data session is established for the subsequently requested application. In the instance in which network-service applications 20 share the same priority category 34, the conflict resolution routine 40 may be configured to allow both applications to share the existing data session (i.e., the subsequently requested application is allowed to "piggy-back" on the existing data session). Priority categories are generally defined by the network operator 16 or service provider and may reflect different billing rate categories. Thus, if two network-service applications 20 share the same priority category it may because the applications have the same billing rate. As such, the two applications may be allowed to share the same data session since the billing rate for the usage of the two applications are the same.

The data session manager 36 of UIM 30 may additionally include a conflict notification generator 42 that is operable to generate and communicate a data session conflict notification 44 to the subscriber/user of the wireless device. The conflict notification generator 42 may be preconfigured to generate and communicate notifications to the subscriber/user or, in some aspect, the subscriber/user may be provided a platform to configure the generation and communication of notifications based on personal preferences or the like. In one aspect, in which data sessions are automatically maintained or shut down and another data session established based on the outcome of the priority conflict, the conflict notification generator 42 may send a conflict notification 44 to the subscriber/user that serves to notify them that a data session is being maintained or that the existing data session is being shut-down and a subsequent data session is being established for the currently requested network-service application 20. In the instance in which the data session is being maintained the conflict notification 44 may additionally notify the subscriber/user that the currently requested network-session is not authorized to launch (based on the application using the existing data session having a preferred priority) or that the currently requested network-session is authorized to launch and communicate in the existing data session (based on the applications having matching priority categories).

In alternate aspects, the conflict notification generator 42 may generate and communicate a notification 44 that provides the user data session options. For example, the notification may provide the subscriber/user a first option to maintain the existing data session and, thus, continue using the network-service application associated with the existing data session or a second option to close the existing data session and establish another data session for the currently requested network-service application. Based on subscriber/user response to the conflict notification 44, the data session manager 36 may communicate appropriate commands to the communication interface 22 to maintain a data session or to close a data session and establish a new data session.

Figure 3:
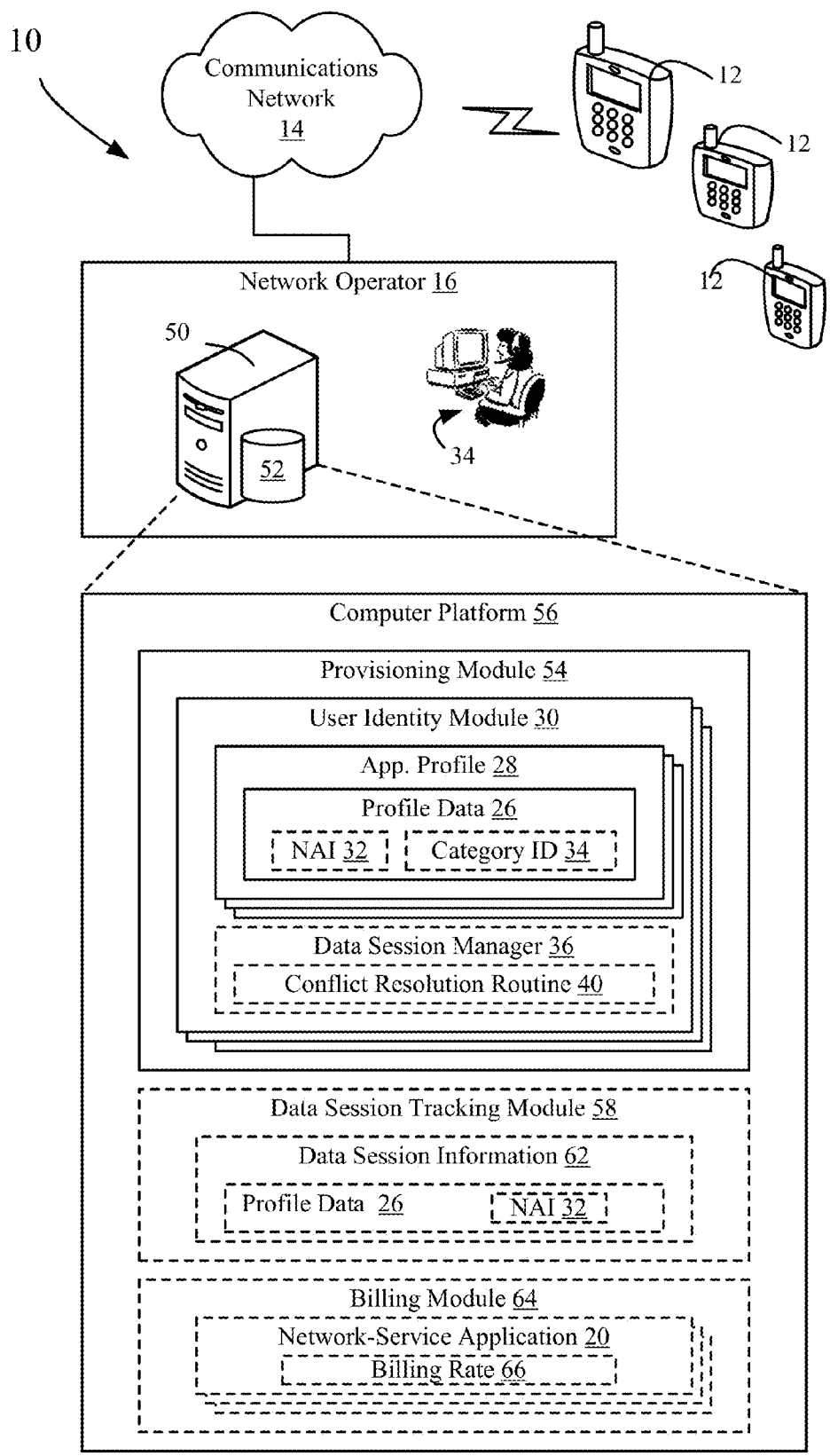
FIG. 3 is schematic diagram of another aspect of a network device within a system for establishing differentiated data sessions between applications on a wireless device and a wireless network.

FIG. 3 provides for another more detailed aspect of system 10, illustrating various aspects associated with the network operator 16 and the one or more network devices 50. As previously described, system 10 includes a network operator 16 including one or more network devices 50, such as network servers and associated data storage devices 52 that store provisioning information and, optionally, data session tracking information.

As previously noted, in one aspect, the network device 50 includes a computer platform 56 having a provisioning module 54 operable for defining provisioning information for wireless devices and providing the provisioning information to the wireless devices in the form of a User Identity Module (UIM) 30. Thus, in one aspect, the provisioning module 54 is operable to define and provide a plurality of application profiles 28, in which each application profile corresponds to a specific network-service application 20 that may be implemented on a wireless communication device 12. The provisioning module 54 additionally is operable to define and provide each application profile 28 with profile data 26. The profile data provides for an application-specific data session to be established, by the communications interface 22 of the wireless device 12, for the corresponding network service application 20. In certain aspects, the profile data may include a Network Address Identifier (NAI) 32 and/or a priority category identifier 34.

The provisioning module 54 of network device 50 may also define and provide for the data session manager 36. As previously noted, the data session manager may be stored on the wireless device 12 or the data session manager 36 may be included within the user identity module 30. In certain aspects, the data session manager 36 may define and provide for one or more conflict resolution routines 40 operable for resolving a data session conflict between a first network-service application 20 using an existing data session and a second network-service application 20 concurrently requesting access to a data session. In certain aspects, the subscriber/user may be provided with more than one conflict resolution routine 40 based on the wireless device providing the ability for user configuration. For example, the wireless device may provide for the user/subscriber to choose between an automatic conflict resolution routine or a subscriber/user option routine that allows the user to choose the application/data session they desire to go forward with.

Additionally, the provisioning module 54 of wireless device 30 is operable to define and provide for User Identity Modules (UIMs) 30 may take the form of removable cards, such as Removable-User Identity Cards (R-UICs) operable to be inserted into open market wireless devices based on subscriber/user procurement of a card. In other aspects, the UIMs may take the form of a permanent module, such as SIM or the like, that is inserted into the wireless device by the network operator prior to point-of-sale, point-of-lease or the like. The UIMs may include the Application profiles 28 and, in some aspects, the data session manager 36 and corresponding conflict resolution routines 40.

Additionally, network operator 16 is operable to monitor, at network device 30 or another network device, the established data sessions, including tracking the profile data 26, such as the network address 32, associated with each session. Thus, network device 30 may include data session tracking module 60 operable for receiving and storing, at data storage 32 or the like, data session information 62. The data session information may include, but is not limited to, profile data 26, such as the NAI 32 and the like. In addition, data session information 62 may include device information 18 or any other information related to the data session. The data session information 62 may be stored in data storage 32, in relation to a respective network-service application, in relation to a respective user/subscriber or wireless device, and/or in relation to a respective wireless communication network. As such, a predetermined party 34, such as a billing entity, marketing, network design, or customer care representative authorized by network operator 16, may utilize the data session information data for one or more of bill generation, network planning activities, marketing activities, troubleshooting activities, etc.

In one specific aspect, the network device 50 of system 10 may include a billing module 64 operable to provide network-service billing based on the data session tracking information 62. As such the billing module 64 may be operable to provide differentiated billing whereby each network-service application 20, as defined by the corresponding assigned network address 32, which is determined in the data session tracking information 62, corresponds to a specific billing rate 66.

Figure 4:
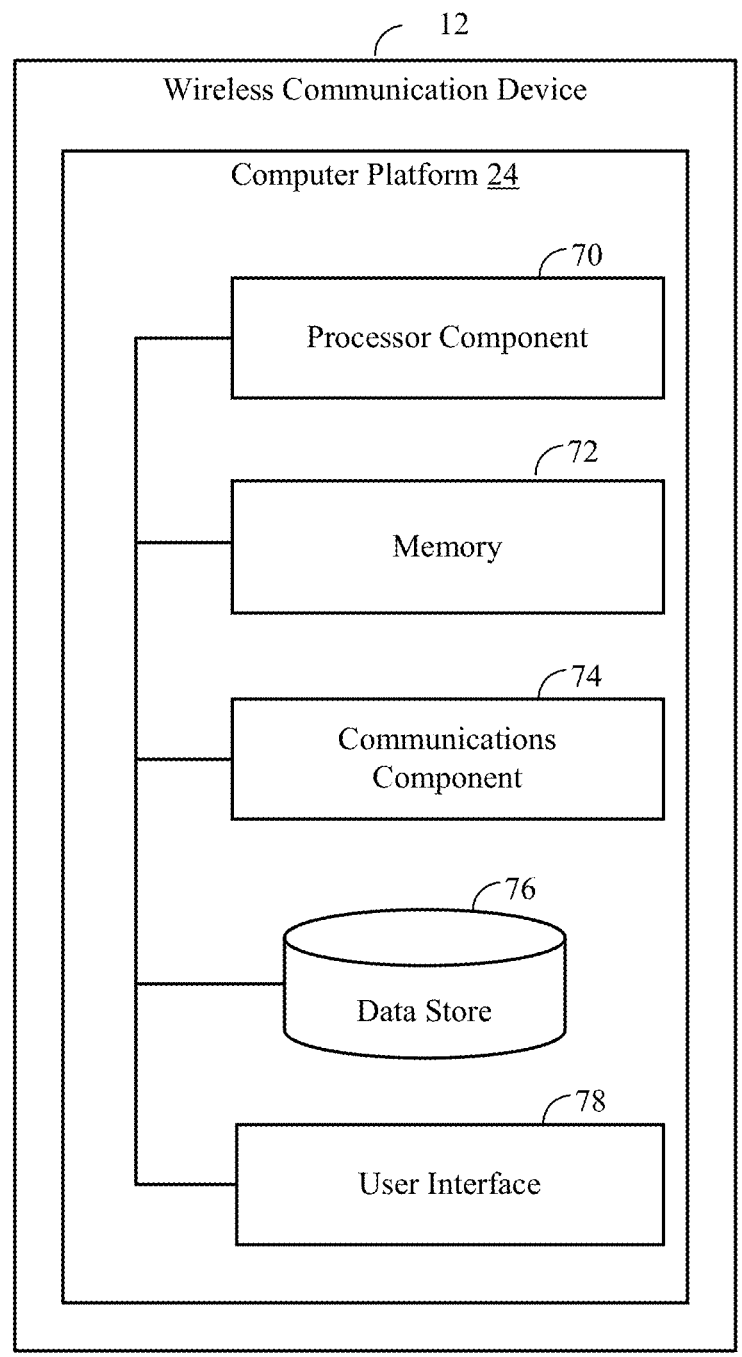
FIG. 4 is a schematic diagram of one aspect of a wireless communication device operable as described herein.
Figure 5:
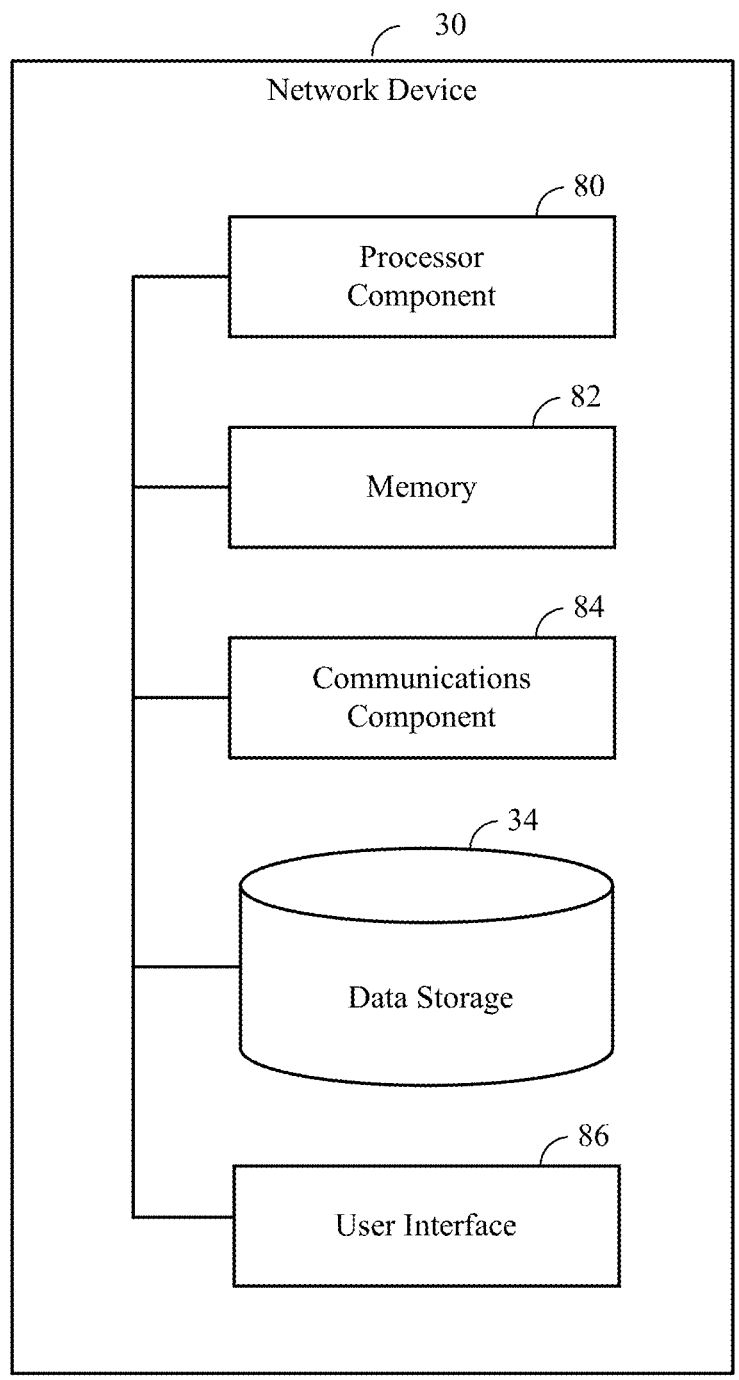
FIG. 5 is a schematic diagram of one aspect of a network device operable as described herein.

Referring to FIG. 4, in one aspect, wireless communications device 12 includes a mobile communication device operable on a wireless communication system. As can be appreciated, there are a variety of wireless communication systems, which often employ different spectrum bandwidths and/or different air interface technologies. Exemplary systems include CDMA (CDMA 2000, EV DO, WCDMA), OFDM, or OFDMA (Flash-OFDM, 802.20, WiMAX), FDMA/TDMA (GSM) systems using FDD or TDD licensed spectrums, peer-to-peer (e.g., mobile-to-mobile) ad hoc network systems often using unpaired unlicensed spectrums, and 802.xx wireless LAN or BLUETOOTH techniques.

Wireless communications device 12 includes processor component 70 for carrying out processing functions associated with one or more of components and functions described herein. Processor component 70 can include a single or multiple set of processors or multi-core processors. Moreover, processing component 70 can be implemented as an integrated processing system and/or a distributed processing system.

Wireless communications device 12 further includes a memory 72, such as for storing local versions of applications being executed by processor component 70. Memory 72 can include random access memory (RAM), read only memory (ROM), and a combination thereof. Additionally, in some aspects (not shown in FIG. 4), memory 72 includes wireless device information 18 and/or network-service applications 20.

Further, wireless communications device 12 includes a communications component 74 that provides for establishing and maintaining communications with one or more parties utilizing hardware, software, and services as described herein. Communications component 74 may carry communications between components on wireless communications device 12, as well as between wireless communications device 12 and external network devices 30, such as devices located across a communications network and/or devices serially or locally connected to wireless communications device 12. In some aspects (not shown in FIG. 4), communications component 74 may include communications interface 22.

Additionally, wireless communications device 12 may further include a data store 76, which can be any suitable combination of hardware and/or software that provides for mass storage of information, databases, and programs employed in connection with aspects described herein. Optionally, in some aspects, data store 76 may include wireless device information 18 and/or network-service applications 20.

Wireless communications device 12 may additionally include a user interface component 78 operable to receive inputs from a user of wireless communications device 12, and to generate outputs for presentation to the user. User interface component 78 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 78 may include one or more output devices, including but not limited to a display, a speaker, a haptic feedback mechanism, a printer, any other mechanism capable of presenting an output to a user, or any combination thereof. In accordance with present aspects, the interface component 78 may include requisite inputs for launching network-service applications 20, displays for displaying conflict resolution notifications 44 and inputs for providing responses to options provided in conflict resolution notifications 44. None of the specific interface components are shown in FIG. 4 for the sake of brevity.

Referring to FIG. 4, in one aspect, network device 30 is operable to communicate with, provide provisioning information in the form of a UIM and/or monitor actions of wireless communication device 12 (FIG. 3), for example, to support the operations of wireless device 12 on a wireless communications network. Network device 30 includes any type of network-based communication device, such as a network server operable on a communication network 14. Communication network 14 may be a wired or wireless communication system, or a combination of both, and includes the wireless network on which wireless device 12 operates.

Network device 30 includes a processor component 80 for carrying out processing functions associated with one or more of components and functions described herein. Processor component 80 can include a single or multiple set of processors or multi-core processors. Moreover, processor component 80 can be implemented as an integrated processing system and/or a distributed processing system.

Network device 30 further includes a memory 82, such as for storing local versions of applications being executed by processor component 80. Memory 82 can include random access memory (RAM), read only memory (ROM), and a combination thereof. Optionally, in some aspects, memory 82 includes data collected in association with the operation of wireless device, such as date session tracking-related data 62, or provisioning information, such as application profiles 28, profile data 26 and the like.

Further, network device 30 includes a communications component 84 that provides for establishing and maintaining communications with one or more parties utilizing hardware, software, and services as described herein. Communications component 84 may carry communications between components on network device 30, as well as between network device 30 and external devices, such as wireless communication device 12, and including devices located across communications network 14 and/or devices serially or locally connected to network device 30. In one aspect, communications component 84 is operable for receiving data session tracking information from the wireless devices and the like.

Additionally, network device 30 may further include database 32, which can be any suitable combination of hardware and/or software that provides for mass storage of information, databases, and programs employed in connection with aspects described herein. In certain aspects, database 32 may store the application profiles 28, the profile data 26, such as the NAIs 32 and the priority category identifiers 34, as well as the data session tracking module 58 and/or the billing module 64.

Network device 30 may additionally include a user interface component 86 operable to receive inputs from a user of network device 30, and to generate outputs for presentation to the user. User interface component 86 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 86 may include one or more output devices, including but not limited to a display, a speaker, a haptic feedback mechanism, a printer, any other mechanism capable of presenting an output to a user, or any combination thereof.

Figure 6:
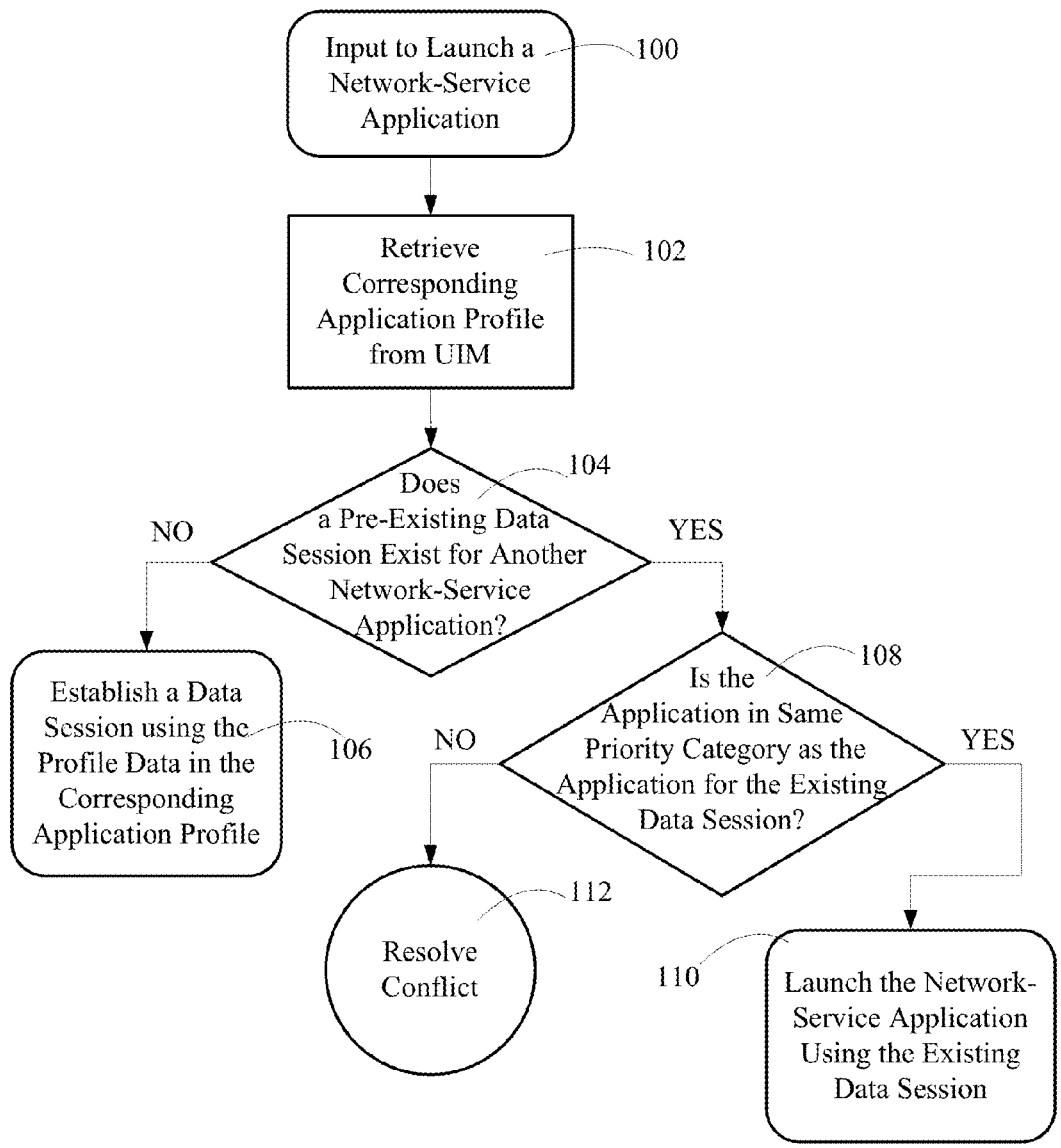
FIG. 6 is a flow diagram depicting a method for establishing data session based on application profiles in a User Identity Module (UIM), according to aspects herein described.

Referring to FIG. 6, a flow diagram is depicted of a methodology for launching a network-service application, in accordance with an aspect of the present innovation. At Event 100, an input is received by the wireless device that is associated with launching a network service application and, at Event 102, the corresponding application profile is retrieved from the UIM. As previously noted, the application profile will include profile data that defines the rules and provides the necessary information for establishing a data session for the network-service application that is attempting to be launched.

At Decision 104, a determination is made as to whether a pre-existing data session exists for another network-service application. If a determination is made that a pre-existing data session does not exists, then at Event 106, a data session is established for the application being launched using the profile data, such as the NAI or the like, in the retrieved application profile. If a determination is made that a pre-existing data session does exist, then at Decision 108, a determination is made as to whether the application is being launched has the same priority category identifier as the application or applications that are currently using the pre-existing data sessions. It should be noted that the data session may have an appropriately assigned priority category based on the priority category identifier in the application profile associated with the network-service application that is using the pre-existing application. If a determination is made that the application or applications using the data session have the same priority category identifier as the application being launched, then at Event 110, the application is allowed to launch using the pre-existing data session. In one aspect of the innovation, network-service applications may be assigned the priority category and thus the application profiles will indicate the same priority category identifiers if the usage of the network-service applications utilize identical tracking. For example, if two or more network-service applications are billed at the same billing rate, the applications having the same billing rate may be assigned the same priority category and use of the existing data session may be shared because the billing rate for the applications is the same.

Figure 7:
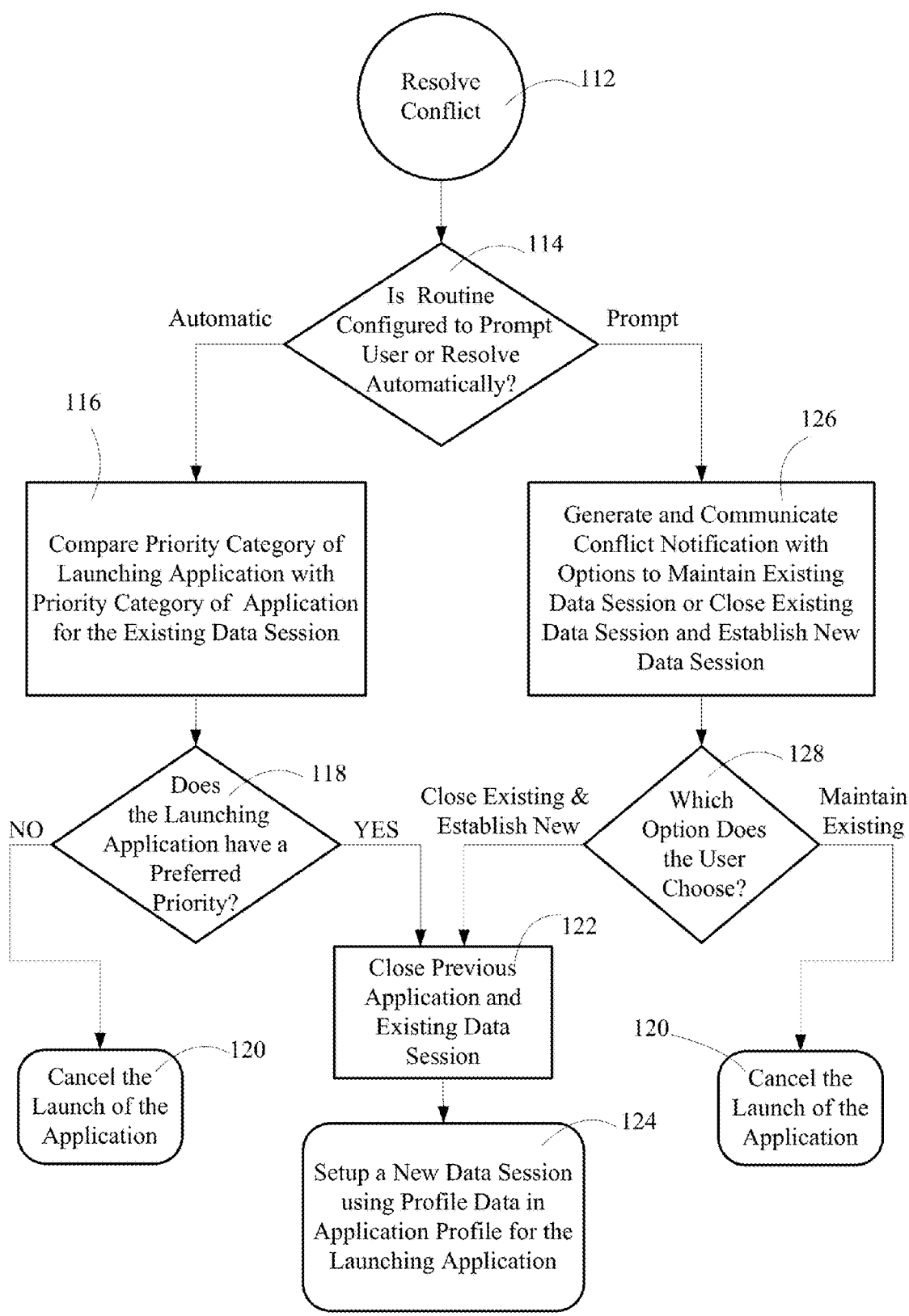
FIG. 7 is a flow diagram depicting a method for resolving data session conflict based on conflict priority defined in application profiles in a UIM, according to aspects herein described.

If a determination is made that the application or applications using the data session do not have the same priority category, then at Event 112, a data session conflict is identified and conflict resolution will ensue. One methodology for data session conflict resolution is provided for in the flow diagram of FIG. 7, according to another aspect of the present innovation. After a conflict has been identified at Event 112, then at Decision 114, a determination is made as to whether the routine is configured to prompt the user with conflict resolution options or whether the routine automatically resolves the conflict based on the priority categories of the competing applications. It should be noted that routine may be either be pre-configured by the network operator or configured as need be by the subscriber/user to provide for either automatic conflict resolution or subscriber/user option conflict resolution.

If the determination is made that the routine is configured to perform automatic conflict resolution, then at Event 116, the priority category of the application being launched is compared to the priority category of the application(s) using the pre-existing data session and, then at Decision 118, a determination is made as to whether the application that is being launched has a more preferred priority (e.g. higher priority) than the application(s) using the pre-existing data session. If the application being launched does not have a more preferred priority, then at Event 120, the launch of the application is cancelled, the pre-existing data session is maintained and only the application(s) currently using the data session is/are allowed to continue using the data session. In addition, cancellation of the launch of the application may provide for a conflict notification to be sent to the subscriber/user notifying them of the cancellation. In turn, if the subscriber/user desires to override the automatic conflict resolution the user may manually teardown the existing data session and establish the data session for the application that had the launch cancelled.

If the application being launched does have a more preferred priority, then at Event 122, the pre-existing data session is automatically closed and the application(s) that were using the pre-existing data session are automatically closed. At Event 124, a new data session is automatically established for the application being launched using the profile data, such as the NAI or the like, in the application profile of the UIM. In addition, automatically closing the pre-existing data session and establishing a new data session may provide for a conflict notification to be sent to the subscriber/user notifying them of the closing of the pre-existing data session and establishment of the new data session. In turn, if the subscriber/user desires to override the automatic conflict resolution the user may manually teardown the new data session and re-establish a new data session associated with applications that were using the pre-existing data session.

Returning to Decision 114, if a determination is made that routine is configured to prompt the subscriber/user with conflict resolution options, then at Event 126, a conflict notification is generated and communicated to the subscriber/user that provides an option for maintaining the pre-existing data session and an option for closing the existing data session and establishing a new data session. At Decision 128, the subscriber/user determines which option they choose. If the subscriber user chooses to maintain the pre-existing data session, then at Event 120, the launch of the application is cancelled, the pre-existing data session is maintained and only the application(s) currently using the data session is/are allowed to continue using the data session. If the subscriber/user chooses to close the existing data session and establish a new data session, then at Event 122, the pre-existing data session is closed and the application(s) that were using the pre-existing data session are automatically closed. At Event 124, a new data session is established for the application being launched using the profile data, such as the NAI or the like, in the application profile of the UIM.

Figure 8:
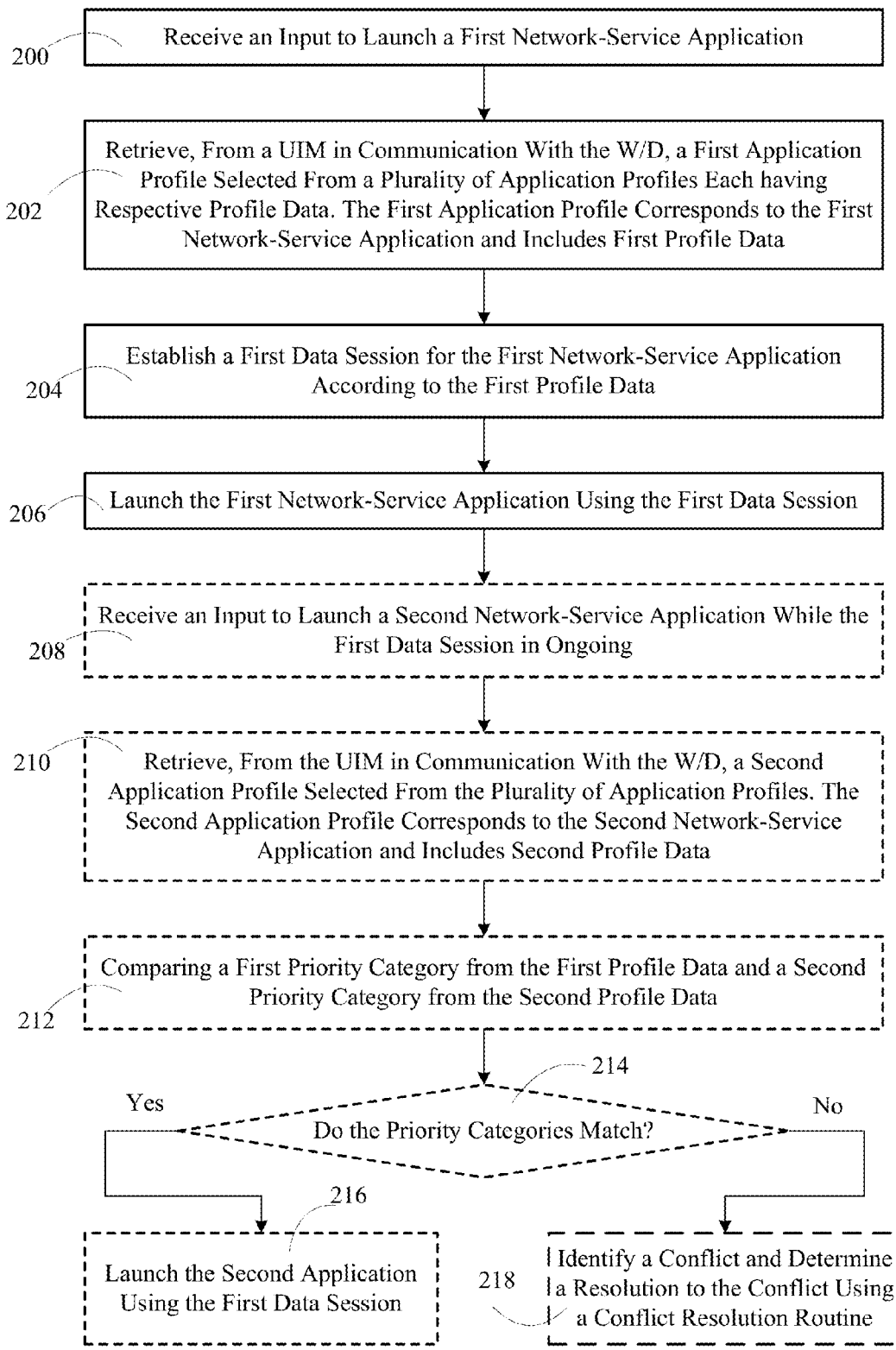
FIG. 8 is flow diagram of a method for establishing data sessions on a wireless device based on application profiles in a User Identity Module (UIM), in accordance with present aspects herein disclosed.

FIG. 8 is another flow diagram of a methodology for differentiated data session access on a wireless device, according to another aspect of the present innovation. At Event 200, the wireless device receives an input to launch a first network-service application and, based on the input. The network service application may include an Internet browser application, a MMS application, a JAVA application, a BREW application, A LBS application or the like. At Event 202, the wireless device retrieves, from a User Identity Module (UIM) in communication with the wireless device, a first application profile selected from a plurality of application profiles, each profile having respective profile data. The first application profile corresponds to the first network-service application and includes first profile data. In one aspect of the method, the profile data includes a network address identifier (NAI) that associates a network address with the network-service application.

At Event 204, the wireless device establishes a first data session for the first network-service application according to the first profile data. In one aspect, in which the profile data includes the NAI, the data session is established according to the NAI associated with the network-service application. At Event 206, the first network-service application is launched using the established first data session.

In optional aspects, the method may additionally include, at Event 208, receiving an input to launch a second network-service application while the first data session is ongoing. Based on receipt of the input, at Event 210, the wireless device retrieves, from the User Identity Module (UIM), a second application profile selected from a plurality of application profiles. The second application profile corresponds to the second network-service application and includes second profile data. At Event 212, the first priority category from the first profile data is compared to the second priority category from the second profile data. At Decision 214, based on the comparison, a determination is made as to whether the first and second priority categories match. If a determination is made that the priority categories match, then at Event 216, the second network-service application is launched using the first data session. Alternatively, if a determination is made that the priority categories do not match, then at Event 218, a conflict is identified and a resolution to the conflict is determined using a predetermined conflict resolution routine. The predetermined conflict resolution routine may automatically maintain the first data session or close the first data session and establish the second data session based on which priority category is determined to be preferred. Alternatively, the predetermined conflict resolution routine may prompt the subscriber user with options for maintaining the first session or closing the first data session and establishing the second data session.

Figure 9:
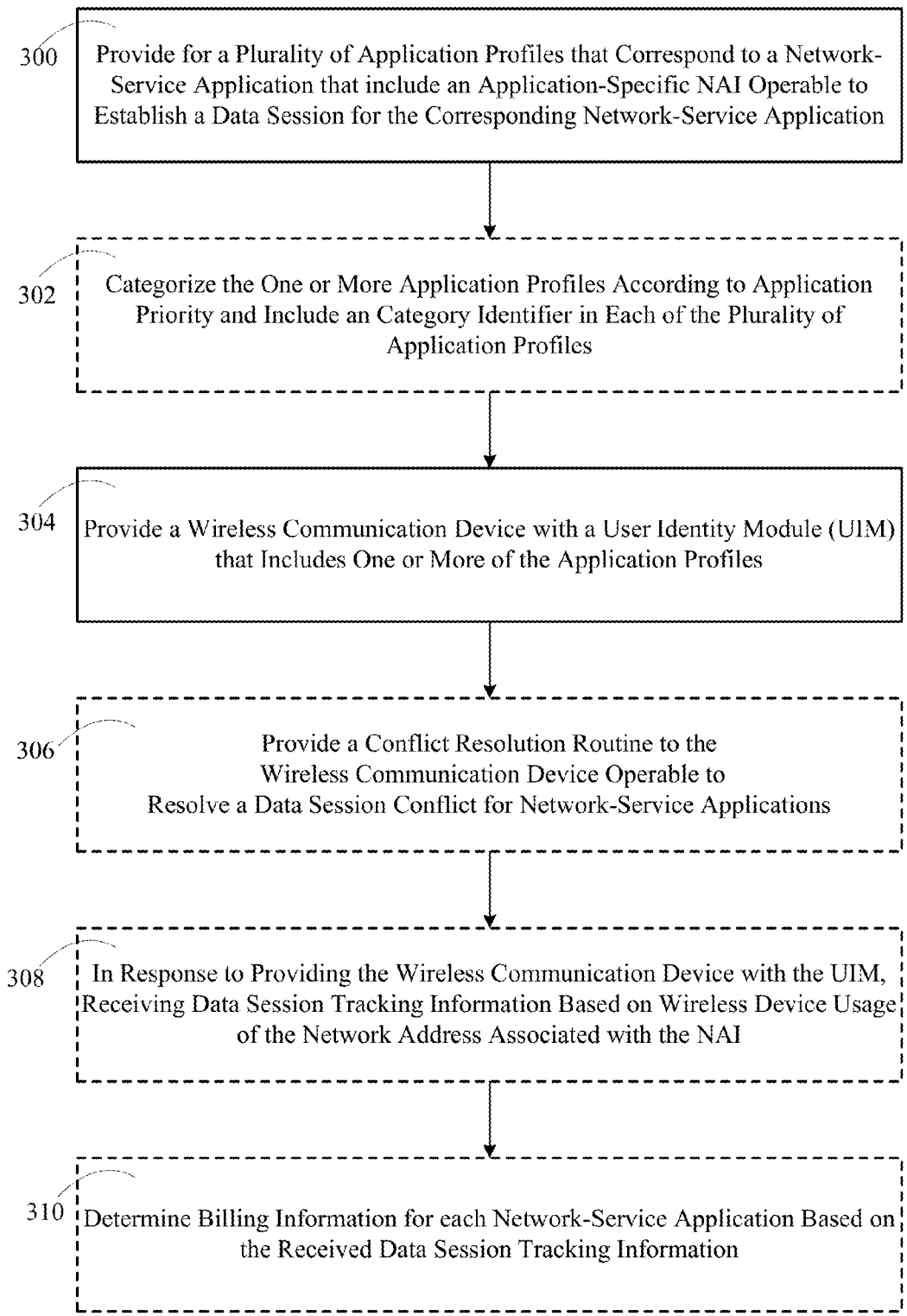
FIG. 9 is a flow diagram of a method for provisioning UIMs at a network device with application profiles, according to aspects herein disclosed.

FIG. 9 is another flow diagram of a methodology for provisioning wireless devices at a network device, according to another aspect of the present innovation. At Event 300, the network device defines and provides for a plurality of application profiles that correspond to network-service applications and include an application-specific network address identifier operable to establish a data session for the corresponding network-service application. At optional Event 302, the network device additionally defines and provides for categorizes for the plurality of application profiles according to application priority and includes a category identifier in each of the plurality of application profiles.

At Event 304, the network devices provides for a User Identity Module (UIM) that includes one or more of the application profiles. The application profiles will define the network-service application that the subscriber is authorized to use on a wireless device. At optional Event 306, the network device may additionally define and provide for a conflict resolution routine that may provided directly to the wireless device or included within the UIM, the conflict resolution routine is operable to resolve a data session conflict for two or more network-service applications requesting a data session at the same time and which are not authorized to share a data session due to conflicting, i.e., non-matching, priority categories.

In addition, the method may include optional Event 308, such that, in response to providing the UIM to a wireless device, receives from the device data session tracking information based on the data session usage of the network address associated with the NAI for a specific network-service application. At additional optional Event 310, the network device may determine billing information for each data session and/or network-service application based on the received data session tracking information. In this regard, the network device may be configured to provide differentiated billing for network-service application on a per data session basis.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Thus, present aspects provide for methods, systems and apparatus for providing differentiated data session access in a wireless device. User Identity Modules (UIMs) are provisioned such that network-service applications resident on the wireless device are associated with a corresponding user profile within the UIM. Each network-service application has a corresponding network address identifier defined within the user profile. The network address associated with the identifier is user to establish a data session for the corresponding network service application. By providing for application-specific network addresses, service providers and/or network operators can differentiate between what services a user is accessing during a data session. This provides for a tracking mechanism that may be used by the service provider or network operator to differentiate the billing rates associated with services. In addition, the UIMs may be provisioned with priority category identifiers that allow the associated network-service application to be prioritized for data session establishment.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of differentiated data session access on a wireless communication device, comprising:
   receiving an input to launch a first network-service application from a plurality of applications stored on the wireless communication device;
   retrieving, from a user identity module in communication with the wireless communication device, a first application profile selected from a plurality of application profiles each having respective profile data, wherein the first application profile corresponds to the first network-service application and comprises first profile data including a first application-specific network address identifier (NAI) different from other application-specific NAIs corresponding to the plurality of application profiles;
   establishing a first data session for the first network-service application according to the first profile data including using the first application-specific NAI to enable tracking the first data session according to usage of the first network-service application; and
   launching the first network-service application using the first data session.

2. The method of claim 1, wherein establishing the first data session for the first network-service application further comprises establishing the first data session for the first application based on the first application-specific NAI.

3. The method of claim 1, further comprising:
   receiving an input to launch a second network-service application while the first data session is ongoing;
   retrieving, from the user identity module, a second application profile selected from the plurality of application profiles, wherein the second application profile corresponds to the second network-service application and comprises second profile data;
   comparing a first priority category from the first profile data and a second priority category from the second profile data; and
   if the comparison results in the first priority category matching the second priority category, then launching the second application using the first data session.

4. The method of claim 1, further comprising:
   receiving an input to launch a second network-service application while the first data session is ongoing;
   retrieving, from the user identity module, a second application profile selected from the plurality of application profiles, wherein the second application profile corresponds to the second network-service application and comprises second profile data;

comparing a first priority category from the first profile data and a second priority category from the second profile data;

identifying a conflict if the comparison results in the first application category not matching the second application category; and determining a resolution to the conflict based on a predetermined resolution routine.

5. The method of claim 4, wherein determining a resolution to the conflict further comprises:

identifying which one of the first priority category and the second application category corresponds to a preferred priority category; and maintaining the first data session and not launching the second application, if the first priority category is identified as the preferred priority category.

6. The method of claim 5, wherein maintaining the first data session further comprises automatically maintaining the first data session and not launching the second application, if the first priority category is identified as the preferred priority category.

7. The method of claim 4, wherein determining a resolution to the conflict further comprises:

providing a conflict notification to a user of the wireless device, wherein the conflict notification provides a first user option to maintain the first data session and not launch the second network-service application and a second user option to close the first data session, establish the second data session and launch the second network-service application;

receiving a user input that corresponds to the first user option; and maintaining the first data session and not launching the second application.

8. The method of claim 4, wherein determining a resolution to the conflict further comprises:

identifying which one of the first priority category and the second application category corresponds to a preferred priority category; and closing the first data session, establishing a second data session according to the second profile data and launching the second network-service application using the second data session, if the second priority category is identified as the preferred priority category.

9. The method of claim 8, wherein retrieving the second application profile further comprises retrieving the second application profile that corresponds to the second application and comprises second profile data including a second network address identifier different from the first network address identifier.

10. The method of claim 9, wherein establishing the second data session further comprises establishing the second data session based on the second network address identifier.

11. The method of claim 8, wherein closing the first data session further comprises automatically closing the first data session, automatically establishing a second data session according to the second profile data and automatically launching the second data session using the second data session, if the second priority category is identified as the higher priority category.

12. The method of claim 4, wherein determining a resolution to the conflict further comprises:

providing a conflict notification to a user of the wireless device, wherein the conflict notification provides a first user option to maintain the first data session and not launch the second network-service application and a second user option to close the first data session, establish the second data session and launch the second network-service application;

receiving a user input that corresponds to the second user option; and closing the first data session, establishing a second data session according to the second profile data and launching the second network-service application using the second data session.

13. The method of claim 8, wherein establishing the first data session or establishing the second data session respectively further comprise generating first billing data corresponding to the first profile data or generating second billing data corresponding to the second profile data, wherein the first billing data differs from the second billing data.

14. At least one processor configured to provide differentiated data session access on a wireless communication device, comprising:

a first module, comprising hardware, for receiving an input to launch a first network-service application from a plurality of applications stored on the wireless communication device;

a second module for retrieving, from a user identity module in communication with the wireless communication device, a first application profile selected from a plurality of application profiles each having respective profile data, wherein the first application profile corresponds to the first network-service application and comprises first profile data including a first application-specific network address identifier (NAI) different from other application-specific NAIs corresponding to the plurality of application profiles;

a third module for establishing a first data session for the first network-service application according to the first profile data including using the first application-specific NAI to enable tracking the first data session according to usage of the first network-service application; and a fourth module for launching the first network-service application using the first data session.

15. A computer program product, comprising:

a non-transitory computer-readable medium comprising:

a first set of codes for causing a computer to receive an input to launch a first network-service application from a plurality of applications stored on a wireless communication device;

a second set of codes for causing the computer to retrieve, from a user identity module in communication with the wireless communication device, a first application profile selected from a plurality of application profiles each having respective profile data, wherein the first application profile corresponds to the first network-service application and comprises first profile data including a first application-specific network address identifier (NAI) different from other application-specific NAIs corresponding to the plurality of application profiles;

a third set of codes for causing the computer to establish a first data session for the first network-service application according to the first profile data including using the first application-specific NAI to enable tracking the first data session according to usage of the first network-service application; and a fourth set of codes for causing the computer to launch the first network-service application using the first data session.

16. An apparatus for providing differentiated data session access on a wireless communication device, comprising:

means for receiving an input to launch a first network-service application from a plurality of applications stored on the wireless communication device;

means for retrieving, from a user identity module in communication with the wireless communication device, a first application profile selected from a plurality of application profiles each having respective profile data, wherein the first application profile corresponds to the first network-service application and comprises first profile data including a first application-specific network address identifier (NAI) different from other application-specific NAIs corresponding to the plurality of application profiles;

means for establishing a first data session for the first network-service application according to the first profile data including using the first application-specific NAI to enable tracking the first data session according to usage of the first network-service application; and means for launching the first network-service application using the first data session.

17. A wireless communication device, comprising:

a computer platform having a processor and a memory;

a plurality of network-service applications in communication with the processor and stored in the memory;

a user identity module in communication with the processor comprising a plurality of application profiles, wherein each application profile corresponds to one of the plurality of network service applications and includes profile data including an application-specific network address identifier (NAI) different from other application-specific NAIs corresponding to the plurality of application profiles; and a communications interface in communication with the processor and operable to establish a data session with a wireless communications network for one of the plurality of network service applications based on the profile data including using the application-specific NAI to enable tracking the data session according to usage of the one of the plurality of network service applications, and an input to launch the network service application.

18. The wireless communication device of claim 17, wherein the communications interface is further operable to establish the data session with the wireless communications network for one of the plurality of a network service applications based on the application-specific NAI.

19. The wireless communication device of claim 17, wherein the user identity module further comprises the plurality of application profiles, wherein each application profile corresponds to one of the plurality of network service applications and includes profile data comprising an priority category identifier that corresponds to a data session priority for the corresponding network-service application.

20. The wireless communication device of claim 17, wherein the user identity module further comprises a data session manager in communication with the processor and communications interface, wherein the data session manager is operable to resolve a data session conflict if a second network-service application is attempted to be launched while a pre-existing first network-service application has an established first data session.

21. The wireless communication device of claim 19, wherein the user identity module further comprises a data session manager in communication with the processor and communications interface, wherein the data session manager is operable to resolve a data session conflict, if a second network-service application is attempted to be launched while a pre-existing first network-service application has an established first data session, based on a comparison of the priority category identifier in the corresponding application profiles.

22. The wireless communication device of claim 20, wherein the data session manger is further operable to communicate a command to the communications interface to close the first data session and establish a second data session if the second network-service application has a more preferred priority than the first network-service application.

23. The wireless communication device of claim 20, wherein the data session manager further comprises a conflict notification generator operable to generate a conflict notification and communicate the notification to a user of the device, wherein the conflict notification provides the user with an option to continue the first data session or close the first data session and establish a second data session.

24. The wireless communication device of claim 18, further comprising a billing data generator in communication with the processor and the data session manager, wherein the billing data generator is operable to generate billing data on a per data session basis and communicate the billing data to a network entity.

25. A method for provisioning a wireless device at a network device, comprising:

providing for a plurality of application profiles that each correspond to one of a plurality of network-service applications and include an application-specific network address identifier (NAI) that is different from other application-specific NAIs corresponding to the plurality of application profiles, wherein the application-specific NAI is operable for establishing a data session for the corresponding network-service application including using the application-specific NAI to enable tracking the data session according to usage of the corresponding network-service application; and providing a wireless communication device with a user identity module that includes one or more of the application profiles.

26. The method of claim 25, further comprising, in response to providing the wireless communication devices with a user identity module, receiving data session tracking information based on wireless device usage of a network address associated with the network address identifier.

27. The method of claim 25, further comprising categorizing the one or more application profiles according to application priority and providing for a priority category identifier in each of the plurality of application profiles.

28. The method of claim 27, further comprising providing a conflict resolution routine that is operable to resolve a data session conflict for network-service applications based on the priority category identifiers in the application profiles and providing for the conflict resolution routine in the user identity module.

29. The method of claim 28, wherein providing the conflict resolution routine further comprises providing a conflict resolution routine that automatically maintains or establishes a data session associated with the network-service application determined to have a priority category identifier associated with a more preferred application priority.

30. The method of claim 28, wherein providing the conflict resolution routine further comprises providing a conflict resolution routine that communicates a conflict notification to a user of the wireless communication device based on identification of a data session conflict, wherein the data session conflict notification provides for a first user option to maintain an existing data session and a second user option to close the existing data session and establish a subsequent data session.

31. The method of claim 26, further comprising determining billing information for data session usage based on the received data session tracking information.

32. The method of claim 31, wherein determining billing information further comprises determining billing information for data session usage based on the received data session tracking information and one or more billing rates associated with the network addresses.

33. At least one processor configured to provision a wireless device at a network device, comprising:
a first module for providing for a plurality of application profiles that each correspond to one of a plurality of network-service applications and include an application-specific network address identifier (NAI) that is different from other application-specific NAIs corresponding to the plurality of application profiles, wherein the application-specific NAI is operable for establishing a data session for the corresponding network-service application including using the application-specific NAI to enable tracking the data session according to usage of the corresponding network-service application; and
a second module for providing a wireless communication device with a user identity module that includes one or more of the application profiles.

34. A computer program product, comprising:
a non-transitory computer-readable medium comprising:
a first set of codes for causing a computer to provide for a plurality of application profiles that each correspond to one of a plurality of network-service applications and include an application-specific network address identifier (NAI) that is different from other application-specific NAIs corresponding to the plurality of application profiles, wherein the application-specific NAI is operable for establishing a data session for the corresponding network-service application including using the application-specific NAI to enable tracking the data session according to usage of the corresponding network-service application; and
a second set of codes for causing the computer to provide a wireless communication device with a user identity module that includes one or more of the application profiles.

35. An apparatus for providing differentiated data session access on a wireless communication device, comprising:
means for providing for a plurality of application profiles that each correspond to one of a plurality of network-service applications and include an application-specific network address identifier (NAI) that is different from other application-specific NAIs corresponding to the plurality of application profiles, wherein the application-specific NAI is operable for establishing a data session for the corresponding network-service application including using the application-specific NAI to enable tracking the data session according to usage of the corresponding network-service application; and
means for providing a wireless communication device with a user identity module that includes one or more of the application profiles.

36. A network system including one or more devices, comprising
a computer platform having a processor and a memory; and
a provisioning module in communication with the processor and stored in the memory, wherein the provisioning module is operable to provide user identity modules (UIMs) with one or more application profiles that each correspond to one of a plurality of network-service applications and include an application-specific network address identifier (NAI) that is different from other application-specific NAIs corresponding to the plurality of application profiles, wherein the application-specific NAI is operable for establishing a data session for the corresponding network-service application including using the application-specific NAI to enable tracking the data session according to usage of the corresponding network-service application.

37. The network system of claim 36, further comprising a data session tracking module operable to receive data session tracking information from wireless communication devices having the UIMs, wherein the data session tracking information is based on wireless device usage of a network address associated with the network address identifier.

38. The network system of claim 36, wherein the provisioning module is further operable to categorize the one or more application profiles according to data session priority and provide for a priority category identifier in each of the application profiles.

39. The network system of claim 38, wherein the provisioning module is further operable to provide a conflict resolution routine that is operable to resolve an application conflict for network-service applications based on the priority category identifiers in the application profiles and provide for the conflict resolution routine in the user identity module.

40. The network system of claim 39, wherein the provisioning module is further operable to provide a conflict resolution routine that automatically maintains or establishes a data session associated with the network-service application determined to have a priority category identifier associated with a more preferred application priority.

41. The network system of claim 39, wherein the provisioning module is further operable to provide a conflict resolution routine that communicates a data session conflict notification to a user of the wireless communication device based on identification of a data session conflict, wherein the data session conflict notification provides for a first user option to maintain an existing data session and a second user option to close the existing data session and establish a subsequent data session.

42. The network system of claim 37, further comprising a billing module operable to determine billing charges for the data session usage in the wireless devices having UIMs based on the received data session tracking information.

43. The network system of claim 42, wherein the billing module is further operable to determine billing charges for the data session usage in the wireless devices having UIMs based on the received data session tracking information and one or more billing rates associated with the network addresses.

44. A method of differentiated data session access on a wireless communication device, comprising:
receiving an input to launch a first network-service application;
retrieving, from a user identity module in communication with the wireless communication device, a first application profile selected from a plurality of application profiles each having respective profile data, wherein the first application profile corresponds to the first network-service application and comprises first profile data;
establishing a first data session for the first network-service application according to the first profile data;
launching the first network-service application using the first data session;
receiving an input to launch a second network-service application while the first data session is ongoing;
retrieving, from the user identity module, a second application profile selected from the plurality of application profiles, wherein the second application profile corresponds to the second network-service application and comprises second profile data;

comparing a first priority category from the first profile data and a second priority category from the second profile data; and if the comparison results in the first priority category matching the second priority category, then launching the second application using the first data session.

45. A method of differentiated data session access on a wireless communication device, comprising:

receiving an input to launch a first network-service application;

retrieving, from a user identity module in communication with the wireless communication device, a first application profile selected from a plurality of application profiles each having respective profile data, wherein the first application profile corresponds to the first network-service application and comprises first profile data;

establishing a first data session for the first network-service application according to the first profile data;

launching the first network-service application using the first data session;

receiving an input to launch a second network-service application while the first data session is ongoing;

retrieving, from the user identity module, a second application profile selected from the plurality of application profiles, wherein the second application profile corresponds to the second network-service application and comprises second profile data;

comparing a first priority category from the first profile data and a second priority category from the second profile data;

identifying a conflict if the comparison results in the first application category not matching the second application category; and determining a resolution to the conflict based on a predetermined resolution routine.

* * * * *